Oct. 11, 1938.  T. C. CROSSMAN  2,133,162
BRAKE RIGGING
Filed Dec. 29, 1937  2 Sheets-Sheet 1

INVENTOR
Theodore C. Crossman
BY A. L. Vencill
HIS ATTORNEY

Oct. 11, 1938.  T. C. CROSSMAN  2,133,162
BRAKE RIGGING
Filed Dec. 29, 1937  2 Sheets-Sheet 2

INVENTOR
Theodore C. Crossman
BY
HIS ATTORNEY

Patented Oct. 11, 1938

2,133,162

UNITED STATES PATENT OFFICE 2,133,162

BRAKE RIGGING

Theodore C. Crossman, Wilkinsburg, Pa., assignor to The American Brake Company, Swissvale, Pa., a corporation of Missouri Application December 29, 1937, Serial No. 182,283

17 Claims. (Cl. 188—33)

My invention relates to brake rigging for railway rolling stock, and particularly to brake rigging for locomotives having one or more wheel and axle assemblies which are permitted to move laterally with respect to the associated frame to enable the wheels to freely follow the track rails at curves or over uneven stretches of track without causing undue side thrust on the rails by the wheels.

More particularly, my present invention relates to brake rigging which is particularly suitable for, although in no way limited to, use on locomotive four wheel radial trailer trucks the one wheel and axle assembly of which is free to move laterally with respect to the truck frame through a relatively large amplitude, and the other wheel and axle assembly of which is incapable of such lateral movement, and one of the principal objects of my invention is to provide a brake rigging for such a truck, which brake rigging may be conveniently mounted on the truck frame, and which is free to follow the movement of the laterally movable wheel and axle assembly, but which will not materially increase the side thrust exerted by or on either wheel and axle assembly.

Other objects and characteristic features of my invention will appear as the description proceeds.

I shall describe one form of brake rigging embodying my invention, and shall then point out the novel features thereof in claims.

Figure 1:
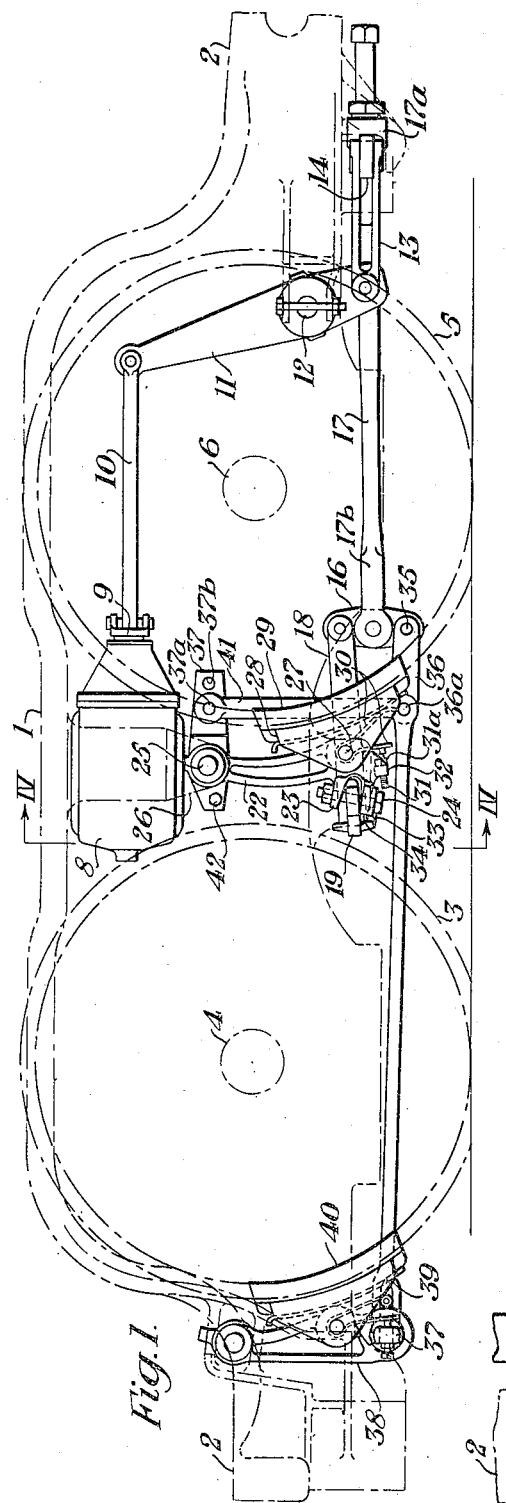
Figure 2:
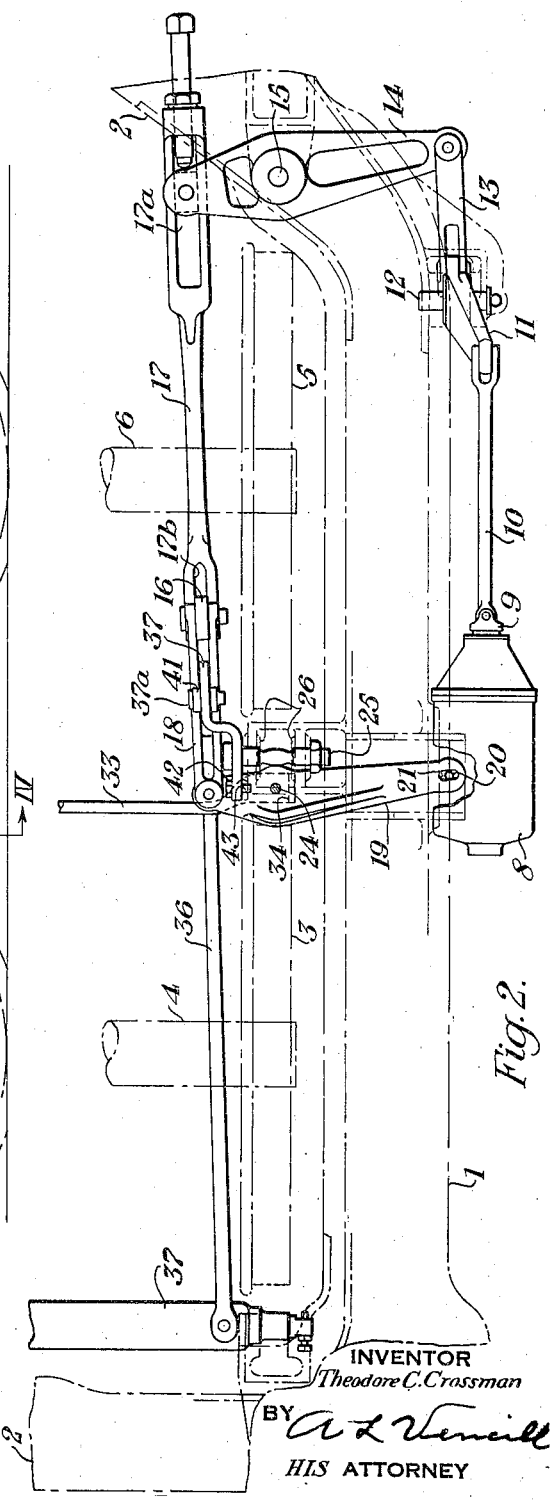
Figure 3:
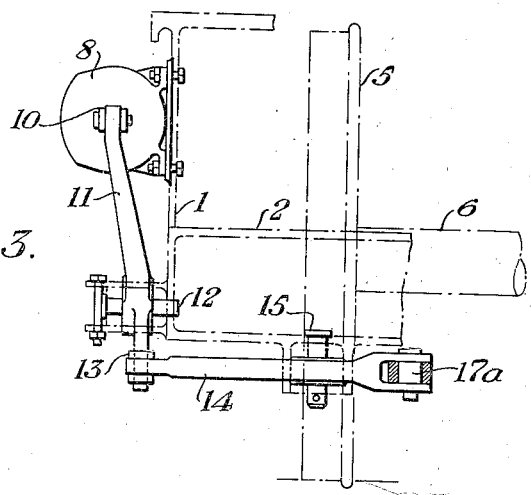
Figure 4:
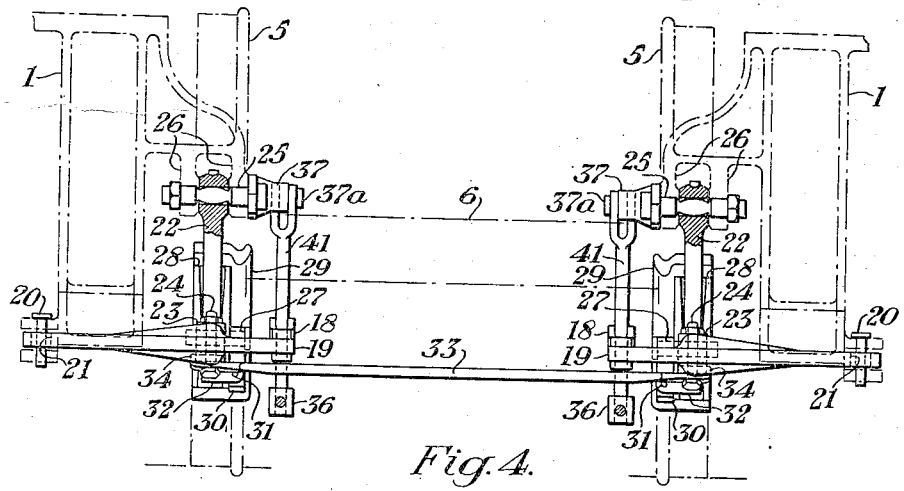
Figure 5:
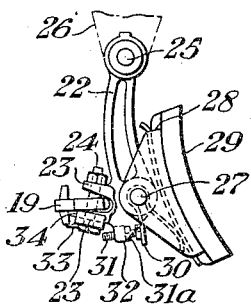
Figure 6:
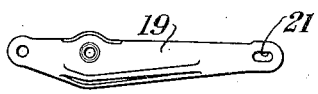

In the accompanying drawings, Fig. 1 is a side elevational view of a locomotive trailer truck provided with brake rigging embodying my invention, the truck frame being shown in dot and dash lines to more clearly illustrate the showing of the brake rigging. Fig. 2 is a top plan view of that portion of the truck frame and brake rigging shown in Fig. 1 which is located on one side of the longitudinal center line of the truck. Fig. 3 is a right-hand elevational view of a portion of the truck and brake rigging shown in Fig. 1. Fig. 4 is a fragmentary cross sectional view of the truck and brake rigging taken substantially on the line IV—IV of Fig. 1 and showing the transversely movable wheel and axle assembly and associated movable portion of the brake rigging. Figs. 5 and 6 are detail views of portions of the brake rigging shown in the preceding views.

Similar reference characters refer to similar parts in each of the several views.

Referring to the drawings, I have here shown my invention applied to a locomotive four wheel trailer truck comprising spaced longitudinally extending side members 1 connected together by spaced transversely extending end members 2. The truck frame is supported at one end by a wheel and axle assembly comprising a pair of wheels 3 mounted on an axle 4, and at the other end by a wheel and axle assembly comprising a pair of wheels 5 mounted on an axle 6. The means for supporting the truck frame by the wheel and axle assemblies is not shown because these means are well-known and form no part of my present invention, but it should be pointed out that the wheel and axle assembly comprising the wheels 3 and axle 4 is not permitted to move any appreciable distance laterally with respect to the truck frame, whereas the wheel and axle assembly comprising the wheels 5 and axle 6 is permitted to move laterally with respect to the truck frame a sufficient distance to enable the wheels to freely follow the track rails at curves or uneven stretches of track without causing undue side thrust by the flange of one or the other of the wheels on the adjacent rail. It should also be pointed out that when it is stated that the wheel and axle assembly comprising the wheels 3 and axle 4 is not permitted to move laterally any appreciable distance, it is to be understood that this wheel and axle assembly will be permitted to move laterally with respect to the truck frame an amount which is equal to the usual operating clearances, but such movement will be so slight that this assembly will at no time strain the brake rigging or interfere with its operation, and so far as this invention is concerned this wheel and axle assembly will be considered as fixed against lateral movement.

The brake rigging comprises two sets of interconnected rods and levers one set of which is arranged at each side of the truck. These two sets of interconnected rods and levers are similar, and it is believed therefore that a description of one will suffice for both.

Referring to the set shown in Figs. 1 and 2, this set is actuated by a brake cylinder 8 which may be secured to the truck frame in any desired location, but which is here shown as secured to the outer side of the side member 1 adjacent the upper end of the side member approximately midway between the two wheel and axle assemblies. The brake cylinder 8 is of the usual and well-known construction, and includes the usual cylinder body, reciprocable piston (not shown) biased to the inner end of its stroke by the usual release spring (not shown), and a push rod 9 which is operatively connected with the piston.

The push rod 9 is operatively connected, through the medium of a push rod 10, with the upper end of a vertically disposed cylinder lever 11. The lever 11 is pivotally supported intermediate its ends on a pin 12 secured to the side member 1, and is operatively connected at its lower end, through the medium of a double jaw 13, with the outer end of a horizontally disposed power transmitting lever 14. This latter lever is pivotally secured intermediate its ends to the truck frame by means of a pin 15, and is operatively connected at its inner end with a vertical equalizing lever 16 intermediate its end by means of a pull rod 17. The pull rod 17 is provided at the end which is connected to the transmitting lever 14 with a slack adjuster 17a of the usual and well-known construction, and at the opposite end with a jaw 17b which receives the equalizing lever 16 with some clearance.

The equalizing lever 16 is operatively connected at its upper end, through the medium of a double jaw 18, with the inner end of a horizontally disposed transversely extending brake lever 19, the outer end of which is pivotally attached to the side member 1 by means of a pin 20 which extends with some clearance through an elongated longitudinally extending slot 21 provided in the lever. Intermediate its ends the brake lever 19 operatively engages the lower end portion of a vertically disposed hanger lever 22 (see Fig. 5) within a recess formed by spaced jaws 23 of the lever. The brake lever is secured against accidental separation from the hanger lever by means of a pin 24 which extends through registering openings in the jaw 23 and lever 19. The hanger lever 22 is located approximately midway between, and within the plane of, the wheels 3 and 5 at one side of the truck, and is pivotally mounted at its upper end on a pin 25 mounted in spaced lugs 26 provided on the side frame 1. The hanger lever intermediate its end has operatively secured thereto, by means of a pin 27, a brake head 28 which is provided with the usual removable brake shoe 29 for engagement with the wheels 5. The brake shoe 29 will preferably be of the flanged type to cause the brake shoe to follow the lateral movement of the wheel 5, and in order to permit the necessary lateral rocking movement of the hanger lever 22 to enable the brake shoe to freely follow the lateral movement of the wheel 5, the portion of the pin 25 upon which the hanger lever is pivotally mounted is made barrel-shaped as clearly shown in Fig. 4. The necessary lateral movement of the brake lever 19 is permitted by the elongated slot 21 referred to hereinbefore. The face of the brake shoe is maintained in the proper parallel relation with respect to the wheel tread by means of an inverted substantially U-shaped spring 30 which fits over one end of the pin 27, and has one leg in engagement with the flange of the brake shoe below the pin 27, and the other leg in engagement with the head of a spring tension adjusting screw 31 which is screwed through a depending lug 32 provided on the hanger lever 22. The screw 31 may be locked in its adjusted position by means of a nut 31a.

Extending laterally of the truck is a connecting bar 33 (see Fig. 4) which has each of its end portion secured to the lower jaw 23 of the adjacent hanger lever 22 by the pin 24. Each end of the bar 33 is provided with a narrow end flange 34 which engages the outer side edge of the lower jaw 23 of the adjacent hanger lever 22. These end flanges, due to their engagement with the hanger levers, relieve the pins 24 of transverse shearing stresses to which these pins are liable to be subjected.

The lower end of the equalizing lever 16 is pivotally connected, by means of a pin 35, to one end of a longitudinally extending pull rod 36, the other end of which rod is pivotally connected in the usual manner to a brake beam 37. The brake beam 37 extends laterally of the truck, and is supported at its ends from the truck frame by suitable hangers 38 which carry intermediate their ends brake heads 39 and brake shoes 40 for engagement with the wheels 3. The last mentioned parts are all of the usual and well-known construction.

In order to support the equalizing lever 16, pull rod 17, double jaw 18 and pull rod 36 in their proper positions without interfering with their necessary and desired movement, a supporting hanger 41 is provided. This hanger is pivotally attached at its lower end to the pull rod 36 by means of a pin 36a and at its upper end to a hanger bracket 37 by means of a pin 37a. The hanger bracket 37 is provided with laterally offset end portions, and is secured to the one lug 26 on the side member 1 of the truck at the inner side of the wheels 3 and 5 by means of the pin 25 which supports the hanger lever 22, and a bolt 42 which passes through the bracket and is screwed into a hole 43 provided in the lug. The end of the bracket to which the hanger lever is attached is provided with an extra hole 37b through which the pin 37a may be passed after the brake shoes become worn to maintain the hanger lever in the proper vertical supporting relation.

The operation of the brake rigging is as follows: When the laterally movable wheel and axle assembly is in its central position with respect to the truck frame, and fluid is exhausted from the brake cylinders 8, all parts occupy the positions in which they are shown in the drawings, and under these conditions the brake shoes are held in positions in which they are just clear of the wheels by the force of the brake cylinder return springs and gravity.

If, now, with the parts in the positions shown, fluid under pressure is supplied to the cylinders 8 to effect an application of the brakes, the push rods 9 will be moved outwardly, and this outward movement will cause the brake cylinder levers 11 to rotate in a clockwise direction about the associated pins 12. This rotation of the brake cylinder levers will transmit through the double jaws 13, transmitting levers 14 and pull rods 17, a force to the equalizing levers 16, which force tends to move these latter levers toward the right, as viewed in Fig. 1. At the equalizing levers 16, the force will divide and one-half of it will be transmitted through the double jaws 18 to the brake levers 19, while the other half will be transmitted through the pull rods 36 to the brake beam 37. As a result, the brake levers 19 will be rotated in a clockwise direction, as viewed in Fig. 2, about the pins 20, which rotation will cause the hanger levers 22, brake heads 28 and brake shoes 29 to move toward the wheels 5 to the positions in which the shoes 29 engage these wheels, while the brake beam 37 will be moved toward the right to cause the hanger levers 38, brake heads 39 and brake shoes 40 to move toward the wheels 3 to the positions in which the brake shoes 40 engage the wheels. It will be seen, therefore, that when fluid pressure is supplied to the brake cylinders 8, the brake rigging operates to cause the brake shoes 29 and 40 to move into braking engagement with the wheels 5 and 3, respectively. It should be noted that due to the fact that the levers 19 are connected with the associated hanger levers 22, which hanger levers, in turn, are secured together by the tie rod 33, the levers 19 are compelled to move through a straight path rather than an arc at the ends at which they are connected to the double jaws 18, but that, due to the fact that the openings 21 which receive the pins 20 are elongated, so that the levers are permitted to move transversely with respect to the vehicle at their outer ends, this movement will not cause any lateral stresses to be exerted on the brake rigging.

If, while the brake shoes are in engagement with the wheels 3 and 5, the wheels 5 and axle 6 should move laterally with respect to the truck frame and consequently with respect to the axle 4 and wheels 3, the brake shoes 29, brake heads 28, hanger levers 22, connecting bar 33 and double jaws 18 will, due to the engagement of the grooves in the brake shoes with the flanges of the wheels 5, move with the wheels laterally with respect to the truck frame. As the brake levers are moved laterally, the ends of the levers which are connected with the frame by means of the pins 20 will slide along the pins 20, the slot 21 being made sufficiently long so that in either extreme position to which the wheels are moved a small amount of clearance will exist between the pins and the adjacent ends of the slots. The normal amount of clearance between the double jaw 18 and equalizing lever 16 is such that this lateral movement of the brake levers 19 will not transmit laterally directed forces to the equalizing levers and other parts connected therewith.

If the brakes are released while the laterally movable wheel and axle assembly is displaced from its normal position, the grooves in the flanged brake shoes will cooperate with the wheel flanges to exert a force on the hanger levers when the wheel and axle assembly subsequently returns to its normal position, which force will cause all of the parts to return to their normal positions shown with respect to the wheel and axle assembly.

From the foregoing description, it will be seen that I have provided a brake rigging for a locomotive truck having a relatively fixed wheel and axle assembly and a wheel and axle assembly which is movable laterally relative to the truck frame, which brake rigging embodies braking elements which are so associated with the laterally movable wheel and axle assembly as to be freely movable laterally of the truck frame with the assembly. It will also be seen that this brake rigging embodies means for moving the associated brake elements relative to both the truck frame and laterally movable wheel and axle assembly to their normal positions with respect to the truck frame when a release of the brakes is effected while the brake rigging associated with the movable wheel and axle assembly is displaced from its normal position, and further embodies means whereby lateral strains will not be transmitted to the brake elements associated with the relatively fixed wheel and axle assembly upon lateral movement of the brake elements associated with the laterally movable wheel and axle assembly.

Although I have herein shown and described only one form of brake rigging embodying my invention, it is understood that various changes and modifications may be made therein within the scope of the appended claims without departing from the spirit and scope of my invention.

Having thus described my invention, what I claim is:

1. In a railway vehicle, in combination, a frame, a wheel arranged for lateral movement relative to said frame and having a braking surface movable therewith, a brake element carried by said frame and being movable into and out of braking engagement with said braking surface and being free to move laterally relative to said frame in response to lateral movement of said wheel, a lever operatively connected intermediate its ends with said element for actuating said element and pivotally secured at its outer end to said frame in a manner permitting longitudinal movement in response to lateral movement of said element, and means connected with said lever at its inner end for actuating said lever.

2. In a railway vehicle, in combination, a frame, a wheel arranged for lateral movement relative to said frame and having a braking surface movable therewith, a brake element carried by said frame and being movable into and out of braking engagement with said braking surface and being constrained to move laterally relative to said frame in response to lateral movement of said wheel, a horizontally disposed lever operatively connected with said element for actuating said element and pivotally secured at its outer end to said frame in a manner permitting longitudinal movement in response to lateral movement of said element, and means connected with said lever at its inner end for actuating said lever.

3. In a railway vehicle, in combination, a frame, a wheel and axle assembly arranged for lateral movement relative to said frame and having a braking surface movable therewith, a brake element carried by said frame and being movable into and out of braking engagement with said braking surface and being free to move laterally relative to said frame in response to lateral movement of said wheel and axle assembly, a horizontally disposed lever operatively connected with said element for actuating said element and provided at its outer end with a longitudinally extending slot which receives a fixed pin secured to to said frame, whereby said lever is pivotally attached to said frame in a manner permitting longitudinal movement of said lever in response to lateral movement of said brake element, and means connected with said lever for actuating it.

4. In an railway vericle, in combination, a frame, a wheel and axle assembly arranged for lateral movement relative to said frame and having a braking surface movable therewith, a brake element carried by said frame and being movable into and out of braking engagement with said braking surface and being free to move laterally relative to said frame in response to lateral movement of said wheel and axle assembly, a horizontally disposed lever operatively connected intermediate its ends with said element for actuating said element and provided at its outer end with a longitudinally extending slot which receives a fixed pin secured to said frame, whereby said lever is pivotally attached to said frame in a manner permitting longitudinal movement of said lever in response to lateral movement of said brake element, and means connected with said lever at its inner end for actuating it.

5. In a railway vehicle, in combination, a frame, a wheel and axle assembly arranged for lateral movement relative to said frame, a brake hanger lever pivotally secured to said frame for movement toward and away from one of the wheels of said wheel and axle assembly and also for lateral rocking movement relative to said frame, a brake element pivotally connected to said brake hanger lever and movable into and out of braking engagement with said braking surface in response to movement of said hanger lever toward and away from the associated wheel, a transversely extending brake lever operatively connected intermediate its ends with said brake hanger lever and pivotally attached at its outer end to said frame in such manner that said brake lever is free to rotate in a direction to move said brake hanger toward and away from the associated wheel and is also free to move longitudinally with respect to said frame an amount equal to the permissible lateral rocking movement of said brake hanger lever, and means connected with the inner end of said brake lever for moving said brake lever to move said brake hanger lever toward and away from the associated wheel.

6. In a railway vehicle, in combination, a frame, a wheel and axle assembly arranged for lateral movement relative to said frame, a brake element carried by said frame and being movable into and out of braking engagement with the tread of one wheel of said wheel and axle assembly and being free to move laterally relative to said frame in response to lateral movement of said wheel and axle assembly, a horizontally disposed lever operatively connected with said element for actuating said element and provided with a longitudinally extending slot which receives a fixed pivot pin secured to said frame, whereby said lever is pivotally attached to said frame in a manner permitting longitudinal movement of said lever in response to lateral movement of said brake element, and means for actuating said lever to move said brake element into and out of braking engagement with the associated wheel.

7. In a railway vehicle, in combination, a frame, a wheel and axle assembly arranged for lateral movement relative to said frame and having two braking surfaces movable therewith, a pair of brake elements carried by said frame and being free to move laterally relative to said frame an amount equal to the movement of said wheel and axle assembly, each said braking element being movable into and out of braking engagement with an adjacent braking surface, a member rigidly tying said elements together laterally of the frame; two brake levers each operatively connected intermediate its ends with a different one of said brake elements, and each pivotally attached at its outer end to said frame in a manner permitting said levers, said members, and said brake elements to move laterally relative to the frame as a unit; and means connected with said levers at their inner ends for actuating said levers to move said brake elements into and out of braking engagement with the associated braking surfaces.

8. In a railway vehicle, in combination, a frame, a wheel and axle assembly arranged for lateral movement relative to said frame and having two braking surfaces movable therewith, a pair of brake elements carried by said frame and being free to move laterally relative to said frame an amount equal to the movement of said wheel and axle assembly, each said braking element being movable into and out of braking engagement with an adjacent braking surface, a member rigidly tying said elements together laterally of the frame, two brake levers each operatively connected with a different one of said brake elements and each provided with a slot which receives a fixed pivot pin secured to said frame, whereby said levers are pivotally attached to said frame in a manner which permits them to move with and in response to the movements of the associated brake elements, and means connected with said levers for actuating said levers to move said brake elements into and out of braking engagement with the associated braking surfaces.

9. In a railway vehicle, in combination, a wheel and axle assembly arranged for lateral movement relative to said frame, two brake hanger levers one pivotally secured to said frame adjacent each wheel of said wheel and axle assembly for movement toward and away from the associated wheel and also for lateral rocking movement relative to said frame, a member rigidly tying said hanger levers together laterally of the frame, two brake elements one pivotally connected with each of said brake hanger levers and each movable into and out of braking engagement with the associated wheel in response to movement of the associated hanger lever toward and away from the associated wheel, two transversely extending brake levers each operatively connected intermediate its ends with a different one of said brake hanger levers and each pivotally attached at its outer end to said frame in such manner that said brake levers are free to rotate in directions to move the associated brake hanger levers toward and away from the associated wheel and are also free to move longitudinally with respect to said frame an amount equal to the permissible lateral rocking movement of said brake hanger levers, and means connected with the inner ends of said brake levers for actuating said brake levers to move said brake hanger levers toward and away from the associated wheels.

10. In a railway vehicle, in combination, a frame, a wheel and axle assembly arranged for lateral movement relative to said frame, a brake element carried by said frame and being movable into and out of braking engagement with one of the wheels of said wheel and axle assembly, a horizontally disposed transversely extending brake lever operatively connected intermediate its ends with said brake element and pivotally attached to said frame outside of the plane of said one wheel in a manner permitting a limited amount of longitudinal movement of said brake lever, a horizontally disposed transversely extending transmitting lever pivotally attached intermediate its ends to said frame at the side of said wheel opposite to said brake lever and operatively connected at its inner end with said brake lever, and means connected with said transmitting lever at its outer end for actuating both said levers to move said braking element into and out of engagement with said one wheel.

11. In a railway vehicle, in combination, a frame supported by two wheel and axle assemblies one of which is fixed against lateral movement with respect to said frame and the other of which is arranged for lateral movement relative to said frame, a plurality of hanger levers one pivotally attached to said frame adjacent each wheel of each wheel and axle assembly for movement toward and away from the associated wheel, the hanger levers which are associated with the wheels of said other wheel and axle assembly also being free to rock through a limited distance in a lateral direction with respect to the frame and being rigidly connected together at their lower ends by a tie rod, brake elements secured to each hanger lever, a brake beam pivotally connected with the hanger levers associated with said one wheel and axle assembly at the lower ends of the levers, two horizontally disposed laterally extending brake levers each operatively connected intermediate its ends with the lower end of a different one of the hanger levers associated with the wheels of said other wheel and axle assembly and pivotally secured at their outer ends to said frame in a manner permitting a limited amount of longitudinal movement of said brake levers, two equalizing levers, each connected at one end with a different end of said brake beam and each connected at the other end with the inner end of a different one of said brake levers, and means connected with said equalizing levers intermediate their ends for actuating them.

12. In a railway vehicle, in combination, a frame supported by two wheel and axle assemblies one of which is fixed against lateral movement with respect to said frame and the other of which is arranged for lateral movement relative to said frame, a plurality of hanger levers one pivotally attached to said frame adjacent each wheel of each wheel and axle assembly for movement toward and away from the associated wheel, the hanger levers which are associated with the wheels of said other wheel and axle assembly also being free to rock through a limited distance in a lateral direction with respect to the frame and being rigidly connected together at their lower ends by a tie rod, brake elements secured to each hanger lever, a brake beam pivotally connected with the hanger levers associated with said one wheel and axle assembly at the lower ends of the levers, two horizontally disposed laterally extending brake levers each operatively connected intermediate its ends with the lower end of a different one of the hanger levers associated with the wheels of said other wheel and axle assembly and pivotally secured at their outer ends to said frame in a manner permitting a limited amount of longitudinal movement of said brake levers, two equalizing levers, each connected at one end with a different end of said brake beam and each connected at the other end with the inner end of a different one of said brake levers, two horizontally disposed transversely extending transmitting levers pivotally attached to said frame on the side of the wheels of said other wheel and axle assembly opposite to said brake levers, two pull rods one connecting the inner end of each transmitting lever with a different one of said equalizing levers intermediate its ends, two brake cylinders secured to said frame at its opposite sides, and means connecting each cylinder with the outer end of the transmitting lever on the same side of the frame.

13. In a railway vehicle, in combination, a frame supported by two wheel and axle assemblies, a brake beam extending transversely of the vehicle at the outer side of the one wheel and axle assembly, a horizontal brake lever extending transversely of the frame between the wheels of said two wheel and axle assemblies at one side of the vehicle and pivotally attached at its outer end to the frame, a vertically disposed equalizing lever connected at one end with one end of said brake lever and at the other end with one end of said brake beam, brake elements operated by said brake beam and said brake lever respectively and cooperating with the associated wheels, and means connected with said equalizing lever intermediate its ends for actuating said equalizing lever.

14. In a railway vehicle, in combination, a frame supported by two wheel and axle assemblies, a brake beam extending transversely of the vehicle at the outer side of the one wheel and axle assembly, a horizontal brake lever extending transversely of the frame between the wheels of said two wheel and axle assemblies at one side of the vehicle and pivotally attached at its outer end to the frame, a vertically disposed equalizing lever connected at one end with one end of said brake lever by means of a double jaw and at the other end with one end of said brake beam by means of a pull rod, a hanger pivotally attached at one end to said pull rod at the end adjacent said equalizing lever and at the other end to said frame for supporting said pull rod, said double jaw and said equalizing lever, and means connected with said equalizing lever intermediate its ends for actuating said equalizing lever.

15. In a railway vehicle, in combination, a frame supported by two wheel and axle assemblies, a brake beam extending transversely of the vehicle at the outer side of the one wheel and axle assembly, a horizontal brake lever extending transversely of the frame between the wheels of said two wheel and axle assemblies at one side of the vehicle and pivotally attached at its outer end to the frame, a vertically disposed equalizing lever connected at one end with one end of said brake lever and at the other end with one end of said brake beam, brake elements operated by said brake beam and said brake lever respectively and cooperating with the associated wheels, a horizontal transmitting lever extending transversely of the frame at the side of the other wheel and axle assembly opposite to said brake lever and pivotally attached intermediate its ends to said frame, a pull rod connecting said equalizing lever intermediate its ends with the inner end of said transmitting lever, and means connected with the outer end of said transmitting lever for actuating it.

16. In a railway vehicle, in combination, a frame supported by two wheel and axle assemblies, a brake beam extending transversely of the vehicle at the outer side of the one wheel and axle assembly, a horizontal brake lever extending transversely of the frame between the wheels of said two wheel and axle assemblies at one side of the vehicle and pivotally attached at its outer end to the frame, a vertically disposed equalizing lever connected at one end with one end of said brake lever by means of a double jaw and at the other end with one end of said brake beam by means of a pull rod, a horizontal transmitting lever extending transversely of the frame at the side of said other wheel and axle assembly opposite to said brake lever and pivotally attached intermediate its ends to said frame, a pull rod connecting said equalizing lever intermediate its ends with the inner end of said transmitting lever, means connected with the outer end of said transmitting lever for actuating it, and a hanger pivotally attached at one end to said first mentioned pull rod at the end adjacent said equalizing lever and at the other end to said frame for supporting both said pull rods, said double jaw and said equalizing lever.

17. In a railway vehicle, in combination, a frame, a wheel arranged for lateral movement relative to said frame and having a braking surface movable therewith, a brake element carried by said frame and being movable into and out of braking engagement with said braking surface and being free to move laterally relative to said frame in response to lateral movement of said wheel, a lever operatively connected with said element for actuating said element and pivotally secured to said frame in a manner permitting lateral movement with said brake element by means of a pin secured to said frame and passing through a slot in said lever, and means for actuating said lever.

THEODORE C. CROSSMAN.